(12) United States Patent
Atamanov (10) Patent No.: US 11,541,999 B2
(45) Date of Patent: Jan. 3, 2023

(54) METHODS OF VERTICAL TAKE-OFF/LANDING AND HORIZONTAL STRAIGHT FLIGHT OF AIRCRAFT AND AIRCRAFT FOR IMPLEMENTATION

(71) Applicant: HOVERSURF, INC., Wilmington, DE (US)

(72) Inventor: Aleksandr V. Atamanov, Saint Petersburg (RU)

(73) Assignee: Hoversurf, Inc., Wilmington, DE (US)

( * ) Notice: Subject to any disclaimer, the term of this patent is extended or adjusted under 35 U.S.C. 154(b) by 0 days.

(21) Appl. No.: 17/488,192

(22) Filed: Sep. 28, 2021

(65) Prior Publication Data
US 2022/0380036 A1 Dec. 1, 2022

(30) Foreign Application Priority Data
Jun. 1, 2021 (RU) .......................... RU2021115701

(51) Int. Cl.
*B64C 29/00* (2006.01)
*B64C 11/46* (2006.01)
*B64D 27/24* (2006.01)

(52) U.S. Cl.
CPC .......... *B64C 29/0025* (2013.01); *B64C 11/46* (2013.01); *B64D 27/24* (2013.01)

(58) Field of Classification Search
CPC ..... B64C 29/0025; B64C 11/46; B64C 27/28; B64C 27/52; B64C 2201/024; B64C 2201/165; B64C 29/00; B64D 27/24
See application file for complete search history.

(56) References Cited

U.S. PATENT DOCUMENTS 1,652,554 A * 12/1927 Bolgiano .............. B64C 23/005
                                                        244/6
2,989,269 A *  6/1961 Le Bel ................ B64C 29/0033
                                                        244/12.3
(Continued)

FOREIGN PATENT DOCUMENTS

CA        2801651 C      1/2012
CN      106585976 A      4/2017
(Continued)

OTHER PUBLICATIONS

U.S. Appl. No. 17/488,134; Office Action dated Jan. 4, 2022; (11 pgs.).

(Continued)

*Primary Examiner* — Medhat Badawi
(74) *Attorney, Agent, or Firm* — Fitch, Even, Tabin & Flannery LLP (57) ABSTRACT

Vertical take-off, landing and horizontal straight flight of an aircraft includes activation a plurality of front and rear lifting propellers, each of which is connected to a respective independently operating electric motor. In addition, horizontal straight flight of the aircraft includes activation of additional left and right pushing propellers, each of which is connected to an independently operating electric motor. The front and rear lifting propellers are respectively positioned generally horizontally and symmetrically opposite to one another and equidistantly relative to a longitudinal axis of the aircraft. The right pushing propeller and the left pushing propeller are positioned generally vertically and symmetrically opposite to one another and equidistantly relative to the longitudinal axis of the aircraft.

16 Claims, 3 Drawing Sheets

(56) References Cited

U.S. PATENT DOCUMENTS

| | | | |
|---|---|---|---|
| 3,039,719 A * | 6/1962 | Platt | B64C 29/0033 244/12.4 |
| 3,181,903 A | 5/1965 | Posva | |
| 3,231,221 A * | 1/1966 | Platt | B64C 29/0033 244/66 |
| 4,358,073 A * | 11/1982 | Eickmann | B64C 29/00 244/60 |
| 4,828,203 A * | 5/1989 | Clifton | B64C 29/0033 244/12.3 |
| 4,899,957 A * | 2/1990 | Eickmann | B64D 35/00 244/6 |
| 5,312,069 A * | 5/1994 | Bollinger | F02K 3/068 244/12.3 |
| 5,320,305 A * | 6/1994 | Oatway | B64C 29/0025 244/12.3 |
| 6,293,491 B1 * | 9/2001 | Wobben | B64D 27/24 244/17.23 |
| 6,732,972 B2 * | 5/2004 | Malvestuto, Jr. | B64C 21/04 244/12.3 |
| 7,159,817 B2 * | 1/2007 | VanderMey | B64C 39/08 244/17.23 |
| 8,181,903 B2 * | 5/2012 | Posva | B64C 15/14 244/12.3 |
| D665,333 S * | 8/2012 | Oliver | D12/330 |
| 9,296,477 B1 * | 3/2016 | Coburn | B64C 27/20 |
| 9,442,496 B1 * | 9/2016 | Beckman | G10K 11/17857 |
| 9,702,254 B2 * | 7/2017 | Saiz | B64D 27/02 |
| 9,764,822 B2 * | 9/2017 | Morrison | G05D 1/0077 |
| 10,053,213 B1 * | 8/2018 | Tu | B64C 39/024 |
| D858,352 S * | 9/2019 | Gan | D12/16.1 |
| D858,353 S * | 9/2019 | Gan | D12/16.1 |
| 10,414,491 B2 * | 9/2019 | Milani | B64C 27/20 |
| 10,455,155 B1 * | 10/2019 | Kalinowski | H04N 5/23254 |
| 10,894,599 B1 * | 1/2021 | Popiks | B64C 5/02 |
| 11,072,421 B2 | 7/2021 | Shi | |
| 11,117,657 B2 * | 9/2021 | Burns | B64C 39/08 |
| 11,242,141 B2 * | 2/2022 | Yoeli | B64C 27/26 |
| 11,332,239 B2 * | 5/2022 | Tian | B64C 39/04 |
| 2003/0062443 A1 * | 4/2003 | Wagner | B64C 29/0025 244/12.3 |
| 2004/0245374 A1 * | 12/2004 | Morgan | B64C 29/0025 244/12.3 |
| 2006/0016929 A1 * | 1/2006 | Mohr | B64C 29/0025 310/112 |
| 2006/0192046 A1 * | 8/2006 | Heath | B64C 15/14 244/12.3 |
| 2006/0231677 A1 * | 10/2006 | Zimet | B64C 27/10 244/17.23 |
| 2009/0159740 A1 * | 6/2009 | Brody | B64C 27/10 244/60 |
| 2011/0042509 A1 * | 2/2011 | Bevirt | B64C 29/0033 244/12.4 |
| 2012/0043413 A1 * | 2/2012 | Smith | B64C 29/0033 244/12.4 |
| 2013/0020429 A1 * | 1/2013 | Kroo | B64C 29/0025 244/6 |
| 2014/0061366 A1 * | 3/2014 | Fink | B64C 39/04 244/6 |
| 2014/0097290 A1 * | 4/2014 | Leng | B64C 11/46 244/6 |
| 2014/0100037 A1 * | 4/2014 | Condon | A63H 27/12 463/40 |
| 2014/0131507 A1 * | 5/2014 | Kalantari | B60F 5/02 244/2 |
| 2015/0012154 A1 * | 1/2015 | Senkel | B64C 27/20 701/4 |
| 2015/0298800 A1 * | 10/2015 | Yoon | B64C 27/20 244/2 |
| 2015/0321759 A1 * | 11/2015 | Caubel | B64C 39/024 244/17.23 |
| 2015/0344134 A1 * | 12/2015 | Cruz Ayoroa | B64C 39/024 244/48 |
| 2015/0353192 A1 * | 12/2015 | Morrison | B64D 31/06 244/17.23 |
| 2015/0377405 A1 * | 12/2015 | Down | B64C 17/06 244/76 R |
| 2016/0031554 A1 * | 2/2016 | Eshkenazy | B64C 39/024 244/6 |
| 2016/0129998 A1 * | 5/2016 | Welsh | B64C 27/24 244/12.3 |
| 2016/0137293 A1 * | 5/2016 | Santangelo | B64C 39/024 244/50 |
| 2016/0137304 A1 * | 5/2016 | Phan | B64D 33/08 244/17.23 |
| 2016/0207625 A1 * | 7/2016 | Judas | B64C 3/38 |
| 2016/0236774 A1 * | 8/2016 | Niedzballa | B64D 27/24 |
| 2016/0236775 A1 * | 8/2016 | Eshkenazy | B64C 29/0025 |
| 2016/0244157 A1 * | 8/2016 | Welsh | B64C 39/024 |
| 2016/0244160 A1 * | 8/2016 | Colten | B60F 5/02 |
| 2016/0272316 A1 * | 9/2016 | Nelson | B64C 39/024 |
| 2016/0280359 A1 * | 9/2016 | Semke | B64C 27/006 |
| 2016/0297520 A1 * | 10/2016 | Sada-Salinas | B64C 29/0025 |
| 2016/0375983 A1 * | 12/2016 | Yan | G05D 1/0094 701/4 |
| 2017/0015412 A1 * | 1/2017 | Matus | B64C 27/08 |
| 2017/0043869 A1 * | 2/2017 | Howard | B64C 27/20 |
| 2017/0050726 A1 * | 2/2017 | Yamada | B64D 1/22 |
| 2017/0057630 A1 * | 3/2017 | Schwaiger | B64C 27/20 |
| 2017/0328513 A1 * | 11/2017 | Davis | B64F 5/60 |
| 2017/0341776 A1 * | 11/2017 | McClure | G01C 21/20 |
| 2018/0008890 A1 * | 1/2018 | Condon | G05D 1/0033 |
| 2018/0140933 A1 * | 5/2018 | Chen | B64C 27/20 |
| 2018/0354617 A1 * | 12/2018 | Frolov | B64C 17/08 |
| 2019/0009899 A1 * | 1/2019 | Tian | G05D 1/0858 |
| 2019/0084684 A1 * | 3/2019 | Eller | B64D 27/24 |
| 2019/0106206 A1 * | 4/2019 | Shi | B64C 11/001 |
| 2019/0233077 A1 * | 8/2019 | Tian | B64C 27/26 |
| 2019/0233098 A1 * | 8/2019 | Tian | B64C 11/46 |
| 2019/0233107 A1 * | 8/2019 | Tian | B64C 39/024 |
| 2019/0256200 A1 * | 8/2019 | Neff | B64D 27/24 |
| 2020/0007825 A1 * | 1/2020 | Jeong | B64F 1/362 |
| 2020/0140078 A1 * | 5/2020 | Lu | B64D 27/24 |
| 2020/0331590 A1 * | 10/2020 | Yuksel | B64C 29/02 |
| 2021/0245872 A1 * | 8/2021 | Poh | B64C 5/02 |
| 2021/0253261 A1 * | 8/2021 | Furukawa | B64D 31/04 |
| 2021/0300535 A1 * | 9/2021 | Petrov | B64C 37/00 |
| 2021/0362866 A1 * | 11/2021 | Tian | B64C 25/06 |
| 2021/0403160 A1 * | 12/2021 | Jeng | F02C 7/264 |
| 2022/0024584 A1 * | 1/2022 | Peterson | B64C 39/024 |
| 2022/0041273 A1 * | 2/2022 | Bevirt | B64D 27/24 |
| 2022/0050476 A1 * | 2/2022 | Adams | G05D 1/0858 |
| 2022/0055764 A1 * | 2/2022 | Robertson | H02P 23/06 |

FOREIGN PATENT DOCUMENTS

| | | |
|---|---|---|
| CN | 109018335 A | 12/2018 |
| CN | 110697035 A | 1/2020 |
| DE | 102013108206 | 2/2015 |
| EP | 3670341 A1 | 6/2020 |
| EP | 3771637 A1 | 2/2021 |
| FR | 3092822 A1 | 8/2020 |
| GB | 2423509 A | 8/2006 |
| GB | 2468917 A | 9/2010 |
| GB | 2555439 A | 5/2018 |
| GB | 2569659 A | 6/2019 |
| JP | 2011255892 A | 12/2011 |
| RU | 127039 U1 | 4/2013 |
| RU | 163412 U1 | 7/2016 |
| RU | 2629478 C2 | 8/2017 |
| RU | 2657650 C1 | 6/2018 |
| WO | 0047470 A2 | 8/2000 |
| WO | 2005039972 A2 | 5/2005 |
| WO | 2005072233 A2 | 8/2005 |
| WO | 2009069109 A2 | 6/2009 |
| WO | 2009108178 A2 | 9/2009 |
| WO | 2011140551 A1 | 11/2011 |
| WO | 2016028358 A2 | 2/2016 |
| WO | 2016181044 A1 | 11/2016 |
| WO | 2017132515 A2 | 8/2017 |
| WO | 2018208652 A1 | 11/2018 |

(56) References Cited

FOREIGN PATENT DOCUMENTS

| WO | 2018209911 A1 | 11/2018 |
|---|---|---|
| WO | 2019244892 A1 | 12/2019 |
| WO | 2020105045 A1 | 5/2020 |
| WO | 2020207862 A1 | 10/2020 |

OTHER PUBLICATIONS

U.S. Appl. No. 17/519,428; Non-Final Office Action dated Feb. 10, 2022; (16 pgs.).

* cited by examiner

PRIOR ART

METHODS OF VERTICAL TAKE-OFF/LANDING AND HORIZONTAL STRAIGHT FLIGHT OF AIRCRAFT AND AIRCRAFT FOR IMPLEMENTATION

CROSS-REFERENCE TO RELATED APPLICATIONS

This Application Claims priority to Russian patent application no. 2021115701, filed Jun. 1, 2021.

TECHNICAL FIELD

The group of inventions described herein relates to aviation technology, namely, to aircraft capable of vertical take-off/landing and horizontal straight flight.

BACKGROUND

From the state of the art, the Multi-rotor Heavy Convento-rotorcraft is known (see Patent of the Russian Federation No. 2521121 for an invention, published on Jun. 27, 2014).

The Convento-rotorcraft is made in the form of the high-positioned monoplane, having rotors in rotary annular channels on the wing consoles, a fuselage with two power beams pivotally mounted in a diamond-shaped rocker plan, which has the possibility of deflecting its beams in the longitudinal plane and equipped with bearing rotors on pylons on its opposite tops. The rotors are connected by transmission shafts to the engines of the power plant mounted in the root part of the wing.

The Convento-rotorcraft has the tail unit with an all-movable stabilizer, the three-rack retractable wheel landing gear, the wing is made in the form of combination of two wings with the close location to each other, mounted by the ledge. The front wing is higher than the rear with the negative degradation of the first to the second in the angle of attack. The inter-gondola sections of the front and rear wings are equipped with the slat and flap and are mounted so that between the rear edge of the front wing and the front edge of the rear wing, which has 45% of the area of the front wing, there is a narrow gap equal to 2.5% of the chord of the front wing at the distance between the middle lines of the profile of the front and rear wings, equal to 30% of the chord of the rear wing.

The disadvantages of the known technical solution are: need to turn the movers; low handling and maneuverability; low safety of take-off, flight and landing of aircraft due to the lack of protection of the rotors from collisions with the ground surface and other obstacles; and large weight and size parameters (characteristics) of the aircraft.

From the state of the art, the method of flying in the air with the possibility of vertical take-off and landing is known (see Patent of the Russian Federation No. 2566177 for an invention, published on Oct. 20, 2015).

The flight method involves the creation of the air flow directed from top to bottom by coaxial movers with blades rotating in opposite directions. The blades have the ability to rotate around their longitudinal axis with the change of the angle of attack. By changing the rotation angles of the movers blades during each rotation, ensure the creation of the horizontal component of the thrust vector and the stabilization of the flight. Horizontal thrust in the steady-state horizontal flight mode is created by the jet mover. By turning the blades of the mover to the angle of attack of 0° in the mode of prolonged horizontal flight, the closed aerodynamic surface is formed—the rotating wing with the possibility of creating the climb power. The movers are connected to the engine through the gear drive system. The mover blades are connected to tilt system, gyroscope and control system.

The disadvantages of the known technical solution are: low reliability and controllability, since for horizontal flight there is one mover installed in the center; possibility of only horizontal straight flight; jet mover is used, which leads to the deterioration of maneuverability and environmental friendliness; low safety of take-off, flight and landing of the aircraft; and lack of protection of the rotors from collisions with the ground surface and other obstacles.

From the state of the art, the method of flight of aircraft and aircraft for its implementation are known (see International Publication of the Application WO2017198082 for an invention, published on May 8, 2017).

The disadvantages of the technical solution known from the state of the art are: need to change the horizontal position of the airframe for straight flight; need to use partially the thrust of the lifting movers to create the force pushing the aircraft forward; low safety of take-off, flight and landing of the aircraft; low flight speed; low flight comfort of the aircraft for passengers; low reliability.

An objective of the group of inventions described herein is to create a compact, safe aircraft during take-off/landing and flight with high maneuverability and controllability, as well as increased flight speed.

SUMMARY

The technical results of the group of inventions described herein include:
  reduction of energy costs for horizontal straight flight;
  increased flight stability and comfort;
  improved flight handling and maneuverability;
  improving environmental friendliness;
  reduced drag during horizontal straight flight;
  increasing the thrust and flight speed of the aircraft;
  increasing the safety of take-off, flight and landing of aircraft;
  increased fail-safety while maintaining the position of the aircraft in flight;
  ensuring the protection of the propellers from collisions with the ground surface and other obstacles during flight;
  increasing the compactness of the aircraft (reducing the overall dimensions of the aircraft);
  possibility to quickly identify and eliminate malfunctions (breakdowns) of electric motors and lifting bearing propellers (rotors);
  possibility of both horizontal straight flight and vertical take-off/landing.

The technical results of the group of inventions described herein are achieved by the fact that the aircraft for vertical take-off/landing and horizontal straight flight contains:
  a plurality of front lifting propellers and a plurality of rear lifting propellers configured to facilitate a vertical take-off or landing of the aircraft when activated, each of the front lifting propellers and the rear lifting propellers being an propeller that is mounted to a load-bearing carriage frame and is connected to a respective independently operating electric motor; wherein the front lifting propellers and the rear lifting propellers are present in equal numbers; wherein the front lifting propellers are positioned generally horizontally and symmetrically opposite to one another and equidistantly relative to the longitudinal axis of the aircraft; and wherein the rear lifting propellers are positioned generally horizontally and symmetrically opposite to one another and equidistantly relative to the longitudinal axis of the aircraft; and at least one right pushing propeller and at least one left pushing propeller configured to facilitate a horizontal straight flight of the aircraft when activated, each of the at least one right pushing propeller and the at least one left pushing propeller being connected to a respective independently operating electric motor; wherein the at least one right pushing propeller and the at least one left pushing propeller are present in equal numbers; and wherein the at least one right pushing propeller and the at least one left pushing propeller are positioned generally vertically and symmetrically opposite to one another and equidistantly relative to the longitudinal axis of the aircraft.

In an embodiment, the right and left pushing propellers are positioned closer to a middle than to opposite ends of the at least one common load-bearing frame and closer to a rear of the aircraft than to a front of the aircraft.

In one embodiment, the right and left pushing propellers are positioned at a middle of the aircraft and on a right side and left side of the aircraft, respectively; and the right and left pushing propellers are positioned on left and right sides of the aircraft and rotate about a horizontal axis parallel to the longitudinal axis of the aircraft.

In an embodiment, the independently operating electric motors of the at least one right and left pushing propellers are coupled to at least one common load-bearing frame oriented perpendicularly to the longitudinal axis of the aircraft, and the right and left pushing propellers are located on right and left sides of the aircraft, respectively, and rotate about a horizontal axis parallel to the longitudinal axis of the aircraft.

In one embodiment, the independently operating electric motors of the front and rear lifting propellers are mounted on an external load-bearing carriage frame, and each of front lifting propellers and the rear lifting propellers rotates about a respective vertical axis.

In an embodiment, the independently operating electric motors of the right and left pushing propellers include a coaxial pair of the independently operating electric motors, and wherein the coaxial pair of the electric motors of the at least one right and left pushing propellers are mounted on at least one common load-bearing frame, and each of at least one right and left pushing propellers rotates about a respective horizontal axis and does not contact the external carriage frame during rotation about the respective horizontal axis.

In one embodiment, the independently operating electric motors of the front and rear lifting propellers include a plurality of coaxial independently operating electric motors, and the coaxial independently operating electric motors of the front and rear lifting propellers mounted to an inner surface of the external carriage frame, and each of at least one right and left pushing propellers rotates about a respective horizontal axis and does not contact the external carriage frame during rotation about the respective horizontal axis.

In one embodiment, the external carriage frame is tubular and in a form of a closed-end or open-end ellipsoid or parallelepiped In an embodiment, the right and left pushing propellers are present in equal total numbers on right and left sides of the aircraft, respectively; and the independently operating electric motors of the at least one right pushing propeller and the at least one left pushing propeller are located interiorly relative to an external carriage frame such that the independently operating electric motors of the at least one right and left pushing propeller are visible and accessible from all sides of the aircraft.

In one embodiment, the front and rear independently operating electric motors of the front and rear lifting propellers are present in equal total numbers at a front and rear of the aircraft, respectively.

BRIEF DESCRIPTION OF THE DRAWINGS

The features and essence of the group of inventions described herein are explained in the following detailed description, illustrated by drawings (see FIGS. 1-5), where the following is shown.

The reference numbers in FIGS. 1-5 indicate the following features of the exemplary embodiments:

1—front movers—main front lifting or carrying rotors or propellers;

2—rear movers—main front running or pushing rotors or propellers;

3—additional (auxiliary) running (pushing) right and left rotors or propellers;

4—load-bearing spatial (tubular) ellipsoid carriage frame of a closed type;

5—independently operating electric motors of a coaxial pair;

6—running (pushing) propellers (rotors) of a coaxial pair;

7—load-bearing power platform—frame located inside the tubular carriage frame;

8—load-bearing power platform—frame for installing running (pushing) right and left propellers;

9—load-bearing power platform—carriage frame for installing the front and rear lifting propellers (movers);

10—internal surfaces (parts) of tubes of the open load-bearing spatial carriage frame that are opposite and symmetrical of relative to each other;

11—front tube of the open load-bearing spatial carriage frame of the lifting RMG;

12—lower tube of the open load-bearing spatial carriage frame of the lifting RMG.

DETAILED DESCRIPTION

Figure 2:
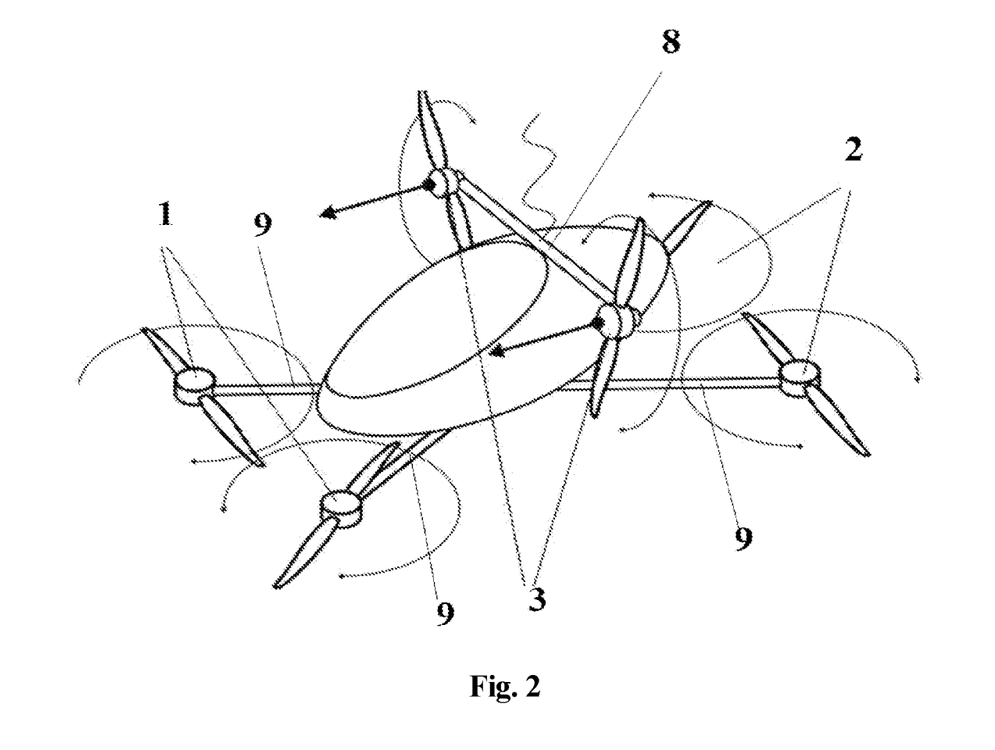
FIG. 2 shows an embodiment of an aircraft for vertical take-off/landing and horizontal straight flight with front and rear lifting propellers and additional auxiliary running (pushing) propellers.

FIG. 2 shows an embodiment of an aircraft with two front 1 and two rear 2 lifting propellers (rotors) and two additional auxiliary running (pushing) propellers (rotors) 3.

Each group of front 1 and rear 2 lifting propellers includes four propellers installed on end sections of a pipe-like load-bearing power platform carriage frame 11.

The front 1 and rear 2 lifting propellers are installed at the front and rear of the aircraft on a load-bearing power platform—carriage frame 9, which is made of pipes that overlap, for example, forming a cross (at the end sections of the pipes).

The running (pushing) propellers (rotors) propellers can be installed from the sides of the aircraft (at the center, on the left and right sides of the aircraft) on one common load-bearing frame 8 in the form of pipe perpendicular to the longitudinal axis of the aircraft, or on two separate bearing frames 8 in the form of pipes perpendicular to the longitudinal axis of the aircraft.

In FIG. 2, the number of installed front 1 and rear 2 lifting propellers (rotors) is the same, and the number of installed running (pushing) bearing propellers (rotors) 3 is the same on each side of the aircraft.

FIG. 2 shows one of the embodiments of the aircraft. Other embodiments of the aircraft are also possible, for example, with four running (pushing) propellers 3 (two on each side of the aircraft), which does not change the essence of the claimed invention.

Also possible is an embodiment of the aircraft, in which only one pushing propeller (rotor) 3 is located in the center of the aircraft or pushing bearing propellers (rotors) 3 are located simultaneously at the center, on the left and on the right of the aircraft.

Figure 3:
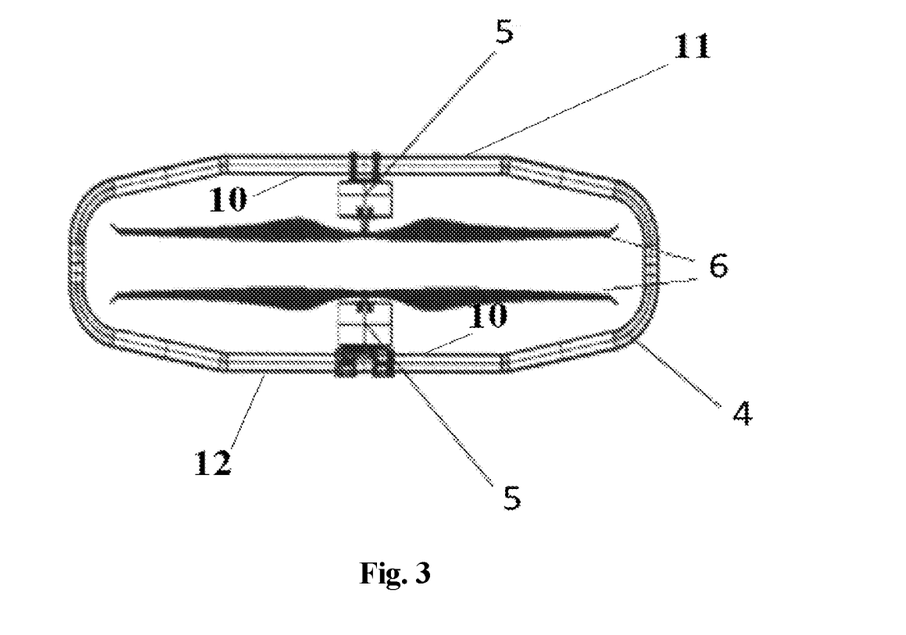
FIG. 3 shows a side view of an embodiment of a rotor-motor group including a coaxial pair of electric motors associated with the right and left pushing propellers, placed and fixed within a generally ellipsoid load-bearing spatial tubular external carriage frame of a closed-end type.

FIG. 3 shows an embodiment of the lifting and running (pushing) RMG in the form of one coaxial pair of electric motors 5 lifting propellers (rotors) 6, fixed inside the open bearing spatial (tubular) frame 4 in the form of ellipsoid (side view—for lifting movers, top view—for running (pushing) movers).

Independently operating electric motors 5 of the lifting (front and rear) propellers (rotors) 6 are fixed by their fixed base to the inner surfaces (parts) 10 of the tubes of the open bearing spatial ellipsoid closed frame 4, thus forming the RMG consisting of one coaxial pair of electric motors 5 of the lifting propellers (rotors) 6.

Independently operating electric motors 5 of the lifting propellers (rotors) 6 are installed inside a load-bearing spatial tubular carriage frame 4 in such a way that they are visible from all external sides and there is access to them. Each of the lifting propellers 6 is connected to the independently operating electric motor 5.

In one embodiment, when installing the RMG inside the frame 4 in front and rear the aircraft, independently operating electric motors 5 of the lifting front 1 and rear 2 lifting propellers (rotors) 6 are installed on the upper 11 and lower 12 internal, relative to the load-bearing carriage frame 9, facing each other, opposite symmetrical relative to each other surfaces (parts) 10 of the tubes of the open bearing spatial frame 4, thus forming (RMG, having one coaxial pair of electric motors 5 of lifting propellers (rotors) 6, in this case, the lifting propellers (rotors) 6 of the coaxial pair rotate parallel to each other around one vertical axis, are turned to each other, do not touch the bearing space carriage frame 4 and only air is between the lifting propellers (rotors) 6 of the coaxial pair.

In another embodiment, when installing the RMG inside the frame 4 at the center and/or to the left and right of the side of the aircraft, independently operating electric motors 5 of the lifting propellers (rotors) 6 are installed on the front 11 and rear 12, relative to the longitudinal axis of the aircraft or the side of the aircraft or the load-bearing frame 8, internal, facing each other, opposite and symmetrical relative to each other surfaces (parts) 10 tubes of the open bearing spatial carriage frame 4, thus forming the rotor-motor group (RMG) having one coaxial pair of electric motors 5 of the lifting propellers (rotors) 6, while the lifting propellers (rotors) 6 of the coaxial pair rotate parallel to each other around one horizontal axis, are turned to each other, do not touch the bearing spatial carriage frame 4 and between the lifting propellers (rotors) 6 there is only air in the coaxial pair.

FIG. 3 shows one of the embodiments of the aircraft with one coaxial pair of electric motors 5 of the lifting propellers (rotors) 6 installed inside one open spatial carriage frame 4. The number of coaxial pairs of electric motors propellers (rotors) inside one open spatial tubular carriage frame 4 can be any, depending on its size and volume.

Figure 4:
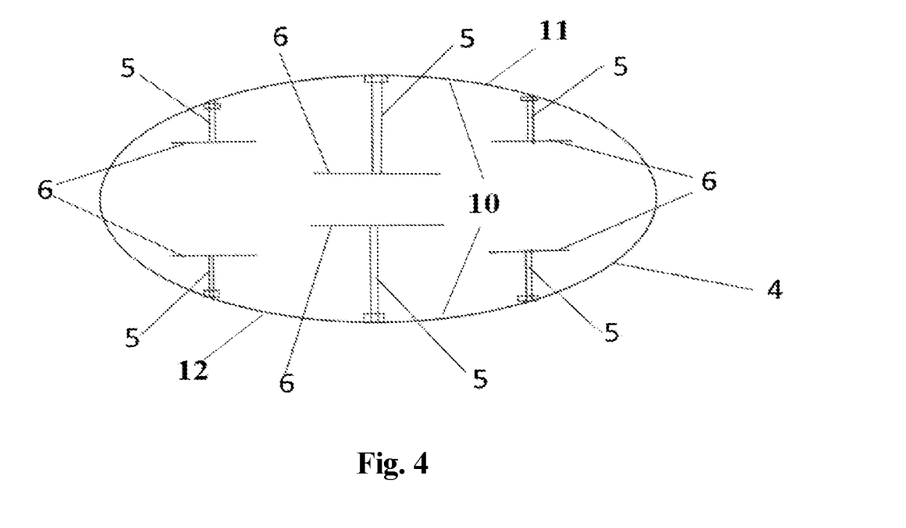
FIG. 4 shows a side view of an embodiment of a rotor-motor group that includes three coaxial pairs of electric motors associated with the front and rear lifting propellers, placed and fixed on inside surfaces of the load-bearing spatial tubular ellipsoid external carriage frame of the closed-end type.

FIG. 4 shows—the embodiment of the lifting and running rotor-motor group (RMG) of the aircraft in the form of three coaxial pairs of electric motors 5 of the lifting propellers (rotors) 6 fixed inside the open bearing spatial (tubular) frame 4 in the form of ellipsoid, closed type (side view—for lifting movers, top view—for running (pushing) movers).

In one embodiment, when installing the RMG inside the frame 4 in front and rear the aircraft, independently operating electric motors 5 of the front and rear lifting propellers 6 are fixed with their immovable foundation on the upper 11 and lower 12, relative to the longitudinal axis of the aircraft (or relative to the load-bearing carriage frame 9), internal, facing each other, opposite and symmetrical of relative to each other internal surfaces (parts) 10 of the tubes of the open bearing spatial frame 4, thus forming the lifting RMG, consisting of three coaxial pairs of electric motors 5 of the lifting propellers (rotors) 6 located at the certain distance from each other, while the lifting propellers (rotors) 6 of the coaxial pair rotate parallel to each other around one vertical axis, are turned to each other, do not touch the open bearing space frame 4 and only air is between the lifting propellers (rotors) 6 of the coaxial pair.

In another embodiment, when installing the RMG inside the frame 4 in the center (closer to the rear part of the side) and/or to the left and right of the side of the aircraft, independently operating electric motors 5 of the lifting propellers (rotors) 6 are fixed with their fixed base on the front 11 and rear 12, relative to the longitudinal axis of the aircraft (or relative to the load-bearing frame 8), internal, facing each other, opposite and symmetrical relative to each other surfaces (parts) 10 of the tubes of the open carrier the spatial carriage frame 4, thus forming the RMG, consisting of three coaxial pairs of electric motors 5 of the lifting propellers (rotors) 6 located at a certain distance from each other, while the lifting propellers (rotors) 6 of the coaxial pair rotate parallel to each other around one horizontal axis, are turned to each other, do not touch the open load-bearing spatial carriage frame 4 and only air is between the lifting propellers (rotors) 6 of the coaxial pair.

In the embodiments of attaching electric motors 5 of the lifting propellers (rotors) 6 to the inner surfaces (parts) 10 of the carriage frame 4 shown in FIGS. 3 and 4, there is a gap of distance (from 5 cm) between the planes of the lifting propellers (rotors) 6 of the coaxial pair, resulting from the strength and flexibility of the structure, to exclude the possibility of collisions during vibration, hard landing, turns, and other. At the centers of the lifting propellers 6, on the sides facing each other, there are fixed Capralon™ cones protruding at the distance of 0.2 mm or more above the plane of the lifting rotor 6, but not touching each other. This makes it possible not to damage the lifting rotor blades 6 even in a critical situation, since any impact will be received by the cones.

FIG. 4 shows one of the embodiments of the aircraft with three coaxial pairs of electric motors 5 of the lifting propellers (rotors) 6 installed inside one open spatial carriage frame 4 at the specified distance from each other. The number of coaxial pairs inside one open spatial tubular carriage frame 4 can be any, depending on its size and volume.

Figure 5:
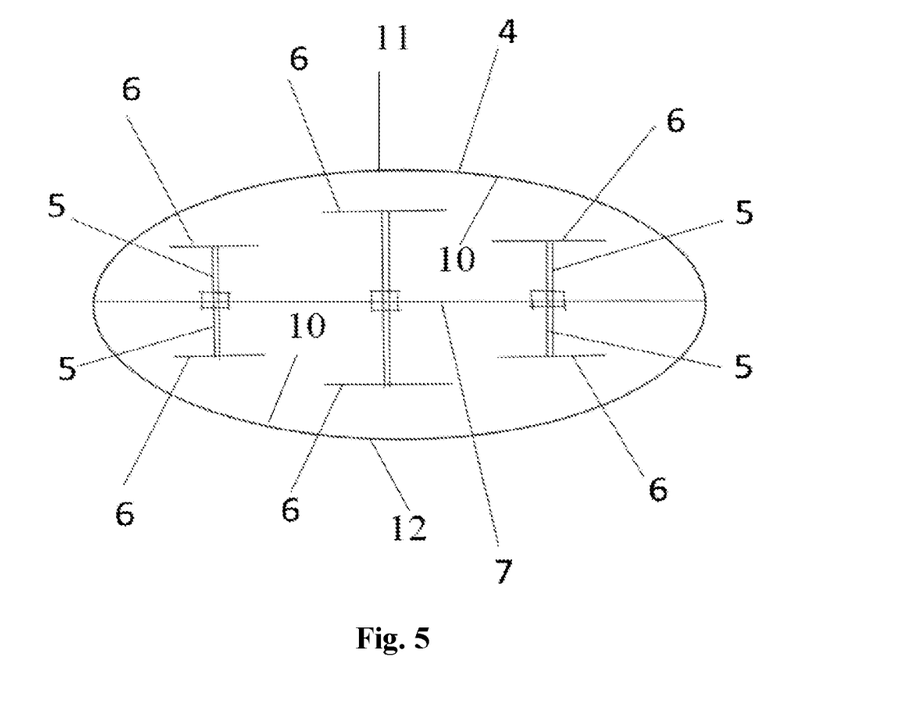
FIG. 5 shows a side view of an embodiment of the aircraft including three coaxial pairs of electric motors of lifting propellers (rotors), placed within an open bearing spatial tubular ellipsoid external carriage frame of the closed-end type and mounted on one inner supporting bearing power platform frame.

FIG. 5 shows another the embodiment of the lifting and running rotor-motor group (RMG) of the aircraft in the form of three coaxial pairs of electric motors 5 of lifting propellers (rotors) 6, fixed inside the open bearing spatial (tubular) carriage frame 4 in the form of ellipsoid at the certain distance from each other (side view—for lifting movers, top view—for running (pushing) movers).

Independently operating electric motors 5 of the lifting propellers (rotors) 6 are fixed by their fixed base perpendicular to the load-bearing power platform—frame 7 located in the central part (in the middle) inside the open spatial tubular ellipsoid carriage frame 4, oppositely and symmetrically relative to each other, thus forming the group of three coaxial pairs of electric motors 5 of the lifting propellers (rotors) 6 located at a certain distance from each other. In this case, the lifting propellers (rotors) 6 of the coaxial pair are turned to the inner surfaces (parts) 10 of the tubes of the open spatial ellipsoid carriage frame 4 facing each other and are not in contact with them, the lifting propellers (rotors) 6 of the coaxial pair rotate parallel to each other and between the lifting propellers (rotors) 6 of the coaxial pair and the inner surfaces (parts) opposite and symmetrical with respect to each other 10 the tubes of the open spatial ellipsoid frame 4 contain only air.

In one embodiment, when installing the RMG at the front and rear of the aircraft, the lifting propellers (rotors) 6 of the coaxial pair are turned to the upper 11 and lower 12, relative to the longitudinal axis of the aircraft (or relative to the load bearing carriage frame 9), internal, facing each other, opposite and symmetrical relative to each other surfaces (parts) 10 of the tubes of the open spatial ellipsoid carriage frame 4, the lifting propellers (rotors) 6 of the coaxial pair rotate parallel to each other around one vertical axis.

In another embodiment, when installing the RMG in the center and/or to the right and left of the side of the aircraft, the running (pushing) and the lifting propellers (rotors) 6 of the coaxial pair are rotated to the front and rear 12, relative to the longitudinal axis of the aircraft (or relative to the load-bearing carriage frame 8), internal, facing each other, opposite and symmetrical relative to each other surfaces (parts) 10 of the tubes of the open spatial ellipsoid carriage frame 4, and the lifting propellers (rotors) 6 of the coaxial pair rotate parallel to each other around one horizontal axis.

FIG. 5 shows—one of the embodiments of the lifting and running RMG of the aircraft. The number of coaxial pairs inside one open spatial tubular carriage frame 4 can be any, depending on its size and volume.

The load-bearing spatial (tubular) carriage frame (ref. no. 4 in FIGS. 3, 4, 5) is a system (space truss) of interconnected tubes made of high-strength materials/metals, for example, aluminum alloy, and performs the function of the screen completely covering the electric motors 5 and the lifting propellers (rotors) 6 from their external sides (surfaces, parts).

The load-bearing spatial tubular carriage frame 4 can be made, for example, in the form of an ellipsoid (FIGS. 3, 4, 5) or parallelepiped (not shown), both closed type (FIGS. 3, 4, 5) and open type (not shown).

The load-bearing power platform carriage frame 9 for lifting propellers 6 is made of pipes that overlap, for example, form a cross.

In one embodiment, the electric motors 5 of the lifting propellers (rotors) 6 are installed on the end sections of the carriage frame pipes 9.

In another embodiment, the open spatial tubular carriage frames 4 are installed on the end sections of the pipes of the carriage frame 4 (in the embodiment of the aircraft, when the electric motors of the lifting propellers (rotors) 6 are fixed on the inner parts (surfaces) 10 of the upper 11 and lower 12 tubes of the frame 4).

The lifting propellers (rotors) 6 can be installed in the center and/or on the sides of the aircraft (from the left and right sides of the aircraft) on one common load-bearing power platform 8 perpendicular to the longitudinal axis of the aircraft, or on different separate load-bearing power platforms.

The number of running (pushing) RMG (see FIGS. 3. 4, 5) on the left and on the right, relative to the side of the aircraft, is the same and can be any. When, for example, three pushing RMGs are installed in the center, to the left and to the right of the side of the aircraft, the pushing RMG are located at the certain distance from each other, while the side pushing RMG are equidistant from the central running RMG.

The number of lifting RMG (see FIGS. 3, 4, 5) at the front and rear of the aircraft is the same and can be any.

The number of the coaxial pairs of electric motors 5 of the lifting propellers (rotors) 6 within each carriage frame 4—screen on the left and right, relative to the side of the aircraft, is the same and can be any depending on its size and volume.

The number of coaxial pairs of electric motors 5 of the lifting propellers (rotors) 6 within one carriage frame 4—screen in the center of the side of the aircraft may be the same or different from the number of coaxial pairs of electric motors 5 of the lifting rotors 6 inside one frame 4, installed to the left and right of the side of the aircraft.

Figure 1:
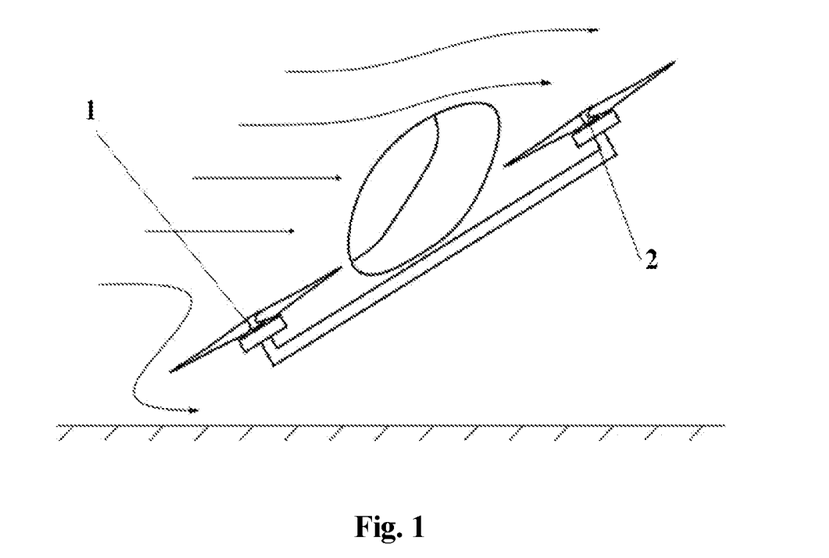
FIG. 1 shows a prior art aircraft with front and rear movers-propellers (rotors).

The aircraft known from the state of the art carry out the horizontal straight flight due to change in the pitch angle (the aircraft leans forward) (see FIG. 1). The angle changes by increasing the thrust on the rear propellers (movers) 2, thereby changing the angle of the aircraft and the thrust vector appears that moves the aircraft forward.

In the claimed aircraft for horizontal straight movement, it is not necessary to change the pitch angle, the aircraft remains in the horizontal plane, thereby reducing drag and increasing the thrust and flight speed of the aircraft. This is achieved by installing additional-auxiliary running (pushing) movers-bearing propellers (rotors) 3 (see FIG. 2) or RMG (see FIGS. 3, 4, 5).

Since for horizontal straight movement, the resulting vertical and horizontal thrust of the rear propellers (movers) 2 is not used (see FIG. 1), and completely the thrust of additional auxiliary running (pushing) propellers (rotors) 3 or RMG (see FIGS. 3, 4, 5), then the energy costs for horizontal straight flight are reduced.

Improved controllability and maneuverability is achieved by changing the thrust on additional auxiliary running (pushing) propellers 3: for turning to the left, the thrust of the right running (pushing) propeller (rotor) (3, FIG. 2) or the thrust of the right lifting propellers (rotors) 6 RMG increases (see FIGS. 3, 4, 5), and for turning to the right, the thrust of the left running (pushing) propeller (rotor) (3, FIG. 2) or the thrust of the left lifting propellers (rotors) 6 of the RMG (see FIGS. 3, 4, 5). Thus, there is the deviation of the aircraft on the course and the correction of the course.

By adjusting the rotation speed of the lifting propellers (rotors) 6, independently of each individually or simultaneously of all, with the help of independently operating electric motors 5, the aircraft can perform various actions (maneuvers) during flight, for example, turn, hover, and also achieve the certain balance to ensure stability and comfort of flight.

The increase of the safety of take-off/landing and flight of aircraft, and ensuring the protection of propellers (rotors) 6 from collisions with the ground surface and other obstacles, is achieved by using, instead of open rotating blades (rotors, propellers), lifting propellers (rotors) 6 located inside an open load-bearing spatial tubular carriage frame 4 that performs the function of screens.

The increase of the fail-safety while maintaining the position of the aircraft in flight and flight safety is ensured by duplicating the RMG of the aircraft (coaxial pairs of independently operating electric motors 5 of the lifting propellers (rotors) 6 are installed.

Increasing the environmental friendliness of the aircraft is achieved through the use of electric motors 5. The electric motors 5 and the lifting propellers (rotors) 6 are installed inside the open space frames 4 in such a way that they are visible from all external sides and there is access to them. This allows you to quickly identify and eliminate various malfunctions (breakdowns) of electric motors 5 and lifting propellers (rotors) 6, repair and replace them.

The increase in the compactness of the aircraft (reduction of overall dimensions, the area of the aircraft) is achieved by installing smaller propellers (rotors) 6 in the form of coaxial pairs (see FIGS. 3, 4, 5), instead of installing one separate propeller (rotor) 1, 2 of a large size (see FIG. 1).

The use of additional running (pushing) propellers (rotors) (3) can significantly increase the thrust and flight speed of the aircraft.

The aircraft described herein for the implementation of described flight method is compact, safe during take-off/landing and flight, and is made with the possibility of both horizontal straight-line flight and vertical take-off/landing, and has high maneuverability and controllability, as well as increased flight speed.

The analysis of the state of the art made it possible to establish that there are no analogs with the set of essential features that are identical and similar to the essential features of the group of inventions described herein, which indicates that the group of inventions described herein meets the "novelty" patentability condition. The results of the search for known solutions in order to identify essential features that coincide with the essential features of the group of inventions described herein that are distinctive from analogues showed that they do not explicitly follow from the state of the art, and the influence of the distinctive essential features on the technical results indicated by the authors has not been established. Therefore, the group of inventions described herein corresponds to the patentability condition "inventive level".

Despite the fact that the above-described group of inventions is described with reference to its certain embodiments, it will be clear to specialists in this field of technology that various changes in the form and content of the group of inventions described herein can be made in it without deviation from the essence and scope of the inventions described herein, which are determined by the attached claims, taking into account the description and drawings.

The invention claimed is:

1. A method of vertical take-off, landing and horizontal straight flight of an aircraft, the method comprising:
   performing a vertical take-off or landing of the aircraft by activating a plurality of front lifting propellers and a plurality of rear lifting propellers, each of the front lifting propellers and the rear lifting propellers mounted to a load-bearing carriage frame and is connected to a respective independently operating electric motor;
   wherein the front lifting propellers and the rear lifting propellers are present in equal numbers;
   wherein the front lifting propellers are positioned horizontally and symmetrically opposite to one another and equidistantly relative to the longitudinal axis of the aircraft; and
   wherein the rear lifting propellers are positioned horizontally and symmetrically opposite to one another and equidistantly relative to the longitudinal axis of the aircraft;
   carrying out a horizontal straight flight of the aircraft by activating at least one right pushing propeller and at least one left pushing propeller, each of the at least one right pushing propeller and the at least one left pushing propeller connected to a respective independently operating electric motor;
   wherein the at least one right pushing propeller and the at least one left pushing propeller are present in equal numbers;
   wherein the at least one right pushing propeller and the at least one left pushing propeller are positioned vertically and symmetrically opposite to one another and equidistantly relative to the longitudinal axis of the aircraft; and
   wherein the load-bearing frame that supports the at least one right pushing propeller and the at least one left pushing propeller is separate from and positioned above the load-bearing frame that supports the front lifting propellers and the rear lifting propellers such that the at least one right pushing propeller and the at least one left pushing propeller are closer to a middle of the aircraft than the front lifting propellers and the rear lifting propellers.

2. The method of claim 1, wherein the independently operating electric motors of the at least one right and left pushing propellers are coupled to at least one common load-bearing frame oriented perpendicularly to the longitudinal axis of the aircraft, and wherein the at least one right and left pushing propellers are located on right and left sides of the aircraft, respectively, and rotate about a horizontal axis parallel to the longitudinal axis of the aircraft.

3. The method of claim 1, wherein the independently operating electric motors of the front and rear lifting propellers are mounted on an external load-bearing carriage frame, and wherein each of front lifting propellers and the rear lifting propellers rotates about a respective vertical axis.

4. The method of claim 3, wherein the independently operating electric motors of the at least one right and left pushing propellers include a coaxial pair of the independently operating electric motors, and wherein the coaxial pair of the electric motors of the at least one right and left pushing propellers are mounted on at least one common load-bearing frame, and wherein each of at least one right and left pushing propellers rotates about a respective horizontal axis and does not contact the external carriage frame during rotation about the respective horizontal axis.

5. The method of claim 3, wherein the independently operating electric motors of the front and rear lifting propellers include a plurality of coaxial independently operating electric motors, and wherein the coaxial independently operating electric motors of the front and rear lifting propellers mounted to an inner surface of the external carriage frame, and wherein each of at least one right and left pushing propellers rotates about a respective horizontal axis and does not contact the external carriage frame during rotation about the respective horizontal axis.

6. The method of claim 3, wherein the external carriage frame is tubular and in a form of a closed-end or open-end ellipsoid or parallelepiped.

7. The method of claim 1,
wherein the at least one right and left pushing propellers are present in equal total numbers on right and left sides of the aircraft, respectively; and
wherein the independently operating electric motors of the at least one right pushing propeller and the at least one left pushing propeller are located interiorly relative to an external carriage frame such that the independently operating electric motors of the at least one right and left pushing propeller are visible and accessible from all sides of the aircraft.

8. The method of claim 1, wherein the front and rear independently operating electric motors of the front and rear lifting propellers are present in equal total numbers at a front and rear of the aircraft, respectively.

9. An aircraft for vertical take-off, landing and horizontal straight flight, the aircraft comprising:
a plurality of front lifting propellers and a plurality of rear lifting propellers configured to facilitate a vertical take-off or landing of the aircraft when activated, each of the front lifting propellers and the rear lifting propellers mounted to a load-bearing carriage frame and connected to a respective independently operating electric motor;
wherein the front lifting propellers and the rear lifting propellers are present in equal numbers;
wherein the front lifting propellers are positioned horizontally and symmetrically opposite to one another and equidistantly relative to the longitudinal axis of the aircraft; and
wherein the rear lifting propellers are positioned horizontally and symmetrically opposite to one another and equidistantly relative to the longitudinal axis of the aircraft;
carrying out a horizontal straight flight of the aircraft by activating at least one right pushing propeller and at least one left pushing propeller, each of the at least one right pushing propeller and the at least one left pushing propeller being connected to a respective independently operating electric motor;
wherein the at least one right pushing propeller and the at least one left pushing propeller are present in equal numbers;
wherein the at least one right pushing propeller and the at least one left pushing propeller are positioned vertically and symmetrically opposite to one another and equidistantly relative to the longitudinal axis of the aircraft; and
wherein the load-bearing frame that supports the at least one right pushing propeller and the at least one left pushing propeller is separate from and positioned above the load-bearing frame that supports the front lifting propellers and the rear lifting propellers such that the at least one right pushing propeller and the at least one left pushing propeller are closer to a middle of the aircraft than the front lifting propellers and the rear lifting propellers.

10. The aircraft of claim 9, wherein the independently operating electric motors of the at least one right and left pushing propellers are coupled to at least one common load-bearing frame oriented perpendicularly to the longitudinal axis of the aircraft, and wherein the at least one right and left pushing propellers are located on right and left sides of the aircraft, respectively, and rotate about a horizontal axis parallel to the longitudinal axis of the aircraft.

11. The aircraft of claim 9, wherein the independently operating electric motors of the front and rear lifting propellers are mounted on an external load-bearing carriage frame, and wherein each of front lifting propellers and the rear lifting propellers rotates about a respective vertical axis.

12. The aircraft of claim 11, wherein the independently operating electric motors of the at least one right and left pushing propellers include a coaxial pair of the independently operating electric motors, and wherein the coaxial pair of the electric motors of the at least one right and left pushing propellers are mounted on at least one common load-bearing frame, and wherein each of at least one right and left pushing propellers rotates about a respective horizontal axis and does not contact the external carriage frame during rotation about the respective horizontal axis.

13. The aircraft of claim 11, wherein the independently operating electric motors of the front and rear lifting propellers include a plurality of coaxial independently operating electric motors, and wherein the coaxial independently operating electric motors of the front and rear lifting propellers mounted to an inner surface of the external carriage frame, and wherein each of at least one right and left pushing propellers rotates about a respective horizontal axis and does not contact the external carriage frame during rotation about the respective horizontal axis.

14. The aircraft of claim 11, wherein the external carriage frame is tubular and in a form of a closed-end or open-end ellipsoid or parallelepiped.

15. The aircraft of claim 9,
wherein the at least one right and left pushing propellers are present in equal total numbers on right and left sides of the aircraft, respectively; and
wherein the independently operating electric motors of the at least one right pushing propeller and the at least one left pushing propeller are located interiorly relative to an external carriage frame such that the independently operating electric motors of the at least one right and left pushing propeller are visible and accessible from all sides of the aircraft.

16. The aircraft of claim 9, wherein the front and rear independently operating electric motors of the front and rear lifting propellers are present in equal total numbers at a front and rear of the aircraft, respectively.

* * * * *